United States Patent [19]

Pearce et al.

[11] Patent Number: 5,796,984
[45] Date of Patent: Aug. 18, 1998

[54] OPERATING SYSTEM INDEPENDENT APPARATUS AND METHOD FOR ELIMINATING PERIPHERAL DEVICE FUNCTIONS

[75] Inventors: John J. Pearce; Kendall C. Witte, both of Austin, Tex.

[73] Assignee: Dell USA, L.P., Round Rock, Tex.

[21] Appl. No.: 592,502

[22] Filed: Jan. 26, 1996

[51] Int. Cl.$^6$ .................................................. G06F 9/455
[52] U.S. Cl. ........................................ 395/500; 395/527
[58] Field of Search .............................. 395/500, 275, 395/183.14, 575, 650, 725, 733, 800; 361/680

[56] References Cited

U.S. PATENT DOCUMENTS

| | | | |
|---|---|---|---|
| 5,121,472 | 6/1992 | Danish et al. | 395/275 |
| 5,175,853 | 12/1992 | Kardach et al. | 395/650 |
| 5,214,785 | 5/1993 | Fairweather | 395/800 |
| 5,237,692 | 8/1993 | Raasch et al. | 395/725 |
| 5,261,079 | 11/1993 | Celi, Jr. | 395/500 |
| 5,357,628 | 10/1994 | Yuen | 395/575 |
| 5,465,364 | 11/1995 | Lathrop et al. | 395/700 |
| 5,485,614 | 1/1996 | Kocis et al. | 361/680 |
| 5,539,879 | 7/1996 | Pearce et al. | 395/184.01 |
| 5,544,344 | 8/1996 | Frame | 395/471 |
| 5,590,312 | 12/1996 | Marisetty | 395/500 |
| 5,600,840 | 2/1997 | Pearce et al. | 395/750 |
| 5,617,572 | 4/1997 | Pearce et al. | 395/750 |
| 5,623,673 | 4/1997 | Gephardt et al. | 395/733 |
| 5,623,696 | 4/1997 | Johnson et al. | 395/681 |
| 5,630,052 | 5/1997 | Shah | 395/183.14 |
| 5,634,132 | 5/1997 | Pearce et al. | 395/750 |
| 5,636,041 | 6/1997 | Pearce et al. | 349/61 |
| 5,680,540 | 10/1997 | Pearce | 395/182.22 |

OTHER PUBLICATIONS

Caton, Michael; "USB makes the right connections: Universal Series Bus' 12M–bps transfer rate will ease hooks between peripherals"; PC Week, Nov. 6, 1995, vol. 12, N. 44; Ziff–Davis Publishing Co., 1995; p. 96(1).

Slater, Michael; "Universal bus to simplify PC I/O: new interface to service keyboards, mice, telecom, and more"; Microprocessor Report (Journal), Apr. 17, 1995, vol. 9, N. 5; MicroDesign Resources, Inc., 1995; p. 1(5).

*Primary Examiner*—Kevin J. Teska
*Assistant Examiner*—Russell W. Frejd
*Attorney, Agent, or Firm*—Skjerven, Morrill, MacPherson, Franklin & Friel, LLP; Kent B. Chambers

[57] ABSTRACT

An emulation methodology utilizes increasing microprocessor performance characteristics and System Management Mode ("SMM") to emulate peripheral device functions in a computer system. The emulation methodology traps addresses associated with I/O between a CPU and one or more peripheral devices. After trapping the I/O instruction address, a system management interrupt issues, and the computer system enters the operating system independent SMM. The CPU executes SMM code which proceeds to pass instructions to the CPU which result in the complete or partial emulation of a peripheral device. When the peripheral device is completely emulated, it can be replaced, for example, with a less expensive, less functional component or possibly even eliminated without substitution. The emulation methodology also responds to asynchronous peripheral device user activity by again trapping an I/O instruction to the peripheral device, and using SMM code to emulate the peripheral device.

41 Claims, 6 Drawing Sheets

OPERATING SYSTEM INDEPENDENT APPARATUS AND METHOD FOR ELIMINATING PERIPHERAL DEVICE FUNCTIONS

FIELD OF THE INVENTION

This invention relates in general to computer systems and, more particularly, to an apparatus and method for eliminating one or more peripheral device functions independent of an operating system.

BACKGROUND OF THE INVENTION

Personal computer ("PC") systems in general and IBM compatible PC systems in particular have attained widespread use. These PC systems handle information and primarily give independent computing power to a single user (or to a relatively small group of users in the case of a PC network). Such PC systems are generally inexpensively priced for purchase by individuals or businesses and provide computing power to many segments of today's society.

A PC system can usually be defined as a desktop, floor-standing, or portable microcomputer that includes a system unit having a central processing unit ("CPU") which is typically associated with devices such as volatile and non-volatile memory, a display monitor, a keyboard, one or more floppy diskette drives, a hard disk storage device, an optional CD-ROM drive, and an optional printer. A PC system may also include one or a plurality of I/O devices (i.e. peripheral devices) coupled to the system processor to perform specialized functions. Examples of I/O devices include keyboard interfaces with keyboard controllers, floppy diskette drive controllers, modems, sound and video devices, and specialized communication devices. These I/O devices are typically plugged into I/O interfaces of the computer system such as serial interfaces and parallel interfaces. Generally, these PC systems use a system board or motherboard to electrically interconnect these devices.

PC systems also typically include basic input/output system ("BIOS") system programs to ease programmer/user interaction with the PC system devices. More specifically, BIOS provides a software interface between the system hardware and the operating system/application program. The operating system ("OS") and application code typically access BIOS rather than directly manipulating I/O ports, registers, and control words of the specific system hardware. Well known device drivers and interrupt handlers access BIOS to, for example, facilitate I/O data transfer between peripheral devices and the OS, application code, and data storage elements. BIOS is accessed through an interface of software interrupts and contains a plurality of entry points corresponding respectively to the different interrupts. In operation, BIOS is typically loaded from a BIOS ROM, which is nonvolatile, to main memory from which it is executed. This practice is referred to as "shadowing" or "shadow RAM" and increases the speed at which BIOS executes.

The CPU provides the "kernel" of the PC system, and I/O communication between an I/O device and the CPU forms a basic feature of PC systems. Many I/O devices include specialized hardware working in conjunction with OS specific device drivers and BIOS routines to perform functions such as data transfer between the I/O device and the CPU.

Referring to FIG. 1, an exemplary I/O device, keyboard user interface 100, is illustrated which allows a user to submit data through keyboard 102 to a PC system having keyboard interface 108. A user enters data by selecting characters arranged on keyboard 102, and scan codes representing a position of the selected characters are transferred via keyboard cable 104 to keyboard controller 106 of keyboard interface 108. Upon receiving a character scan code, keyboard controller 106 causes interrupt request logic 110 to issue a hardware interrupt to the PC system CPU (not shown) over interrupt request line 112 via bus 114. Interrupt request line 112 is usually designated IRQ1 in IBM™ compatible PC systems.

FIG. 2 illustrates a well-known embodiment of keyboard user interface 100. Keyboard 202, which may be, for example, an IBM™ brand PC/AT™ or PS/2™, includes a scan matrix 204 having an X-Y line intersection which is activated by a selected switch or key. (IBM™, PC/AT™, and PS/2™ are trademarks of International Business Machines Corp.). A keyboard processor 206, such as an ANY KEY ROLLOVER ASIC chip, checks the status of the scan matrix with X and Y line decoders 208 and 210, respectively, to determine an open or closed state of the switch(es) by, for example, successively and individually activating X lines 209 to detect a Y line(s) 211 signal reception or signal termination. In this manner, the keyboard processor 206 identifies selected and deselected switches. The keyboard processor 206 writes a scan code, usually in the form of a well-known serial data unit, corresponding to the identified switch into a keyboard internal buffer 212 and transmits the scan code via keyboard cable 214 to an input port 215 of keyboard controller 218 typically using a well-known serial data unit.

The keyboard interface 216 generally includes a serial interface and interrupt logic for the PC/XT™ (not shown) or includes a PC/AT™ keyboard controller 218, such as an Intel™ 8042, 8051, 8741, or 8742 and interrupt logic 220. (PC/XT™ is a trademark of International Business Machines Corp., and Intel™ is a trademark of the Intel Corp.). The keyboard controller 218 reads the scan codes in input port 215 and transfers the contents of input port 215 to keyboard controller output buffer 222. Next, interrupt logic 220 issues a hardware interrupt, for example, via Interrupt Request Line IRQ1 to a PC system CPU (not shown) via bus 224.

Control and monitoring of the PC system hardware is generally the responsibility of the OS which mainly uses device drivers to access PC system hardware. In response to the issued interrupt, the CPU saves the current CPU status, for example, current flags, code segment register, and instruction pointer ("EIP"), and enters a keyboard device driver interrupt handler. The interrupt handler retrieves the scan code from the keyboard controller output buffer 222 which is assigned a specific address, usually 60h (where the "h" suffix indicates a hexadecimal value). The keyboard driver then generally uses an internal conversion table to convert the scan code to an ASCII code, if an ASCII character code is available, or carries out certain predefined, well-known functions. The keyboard driver stores the codes in a keyboard buffer such as a BIOS data area. The stored codes are passed to a program which acts on them accordingly.

In addition to reading data from the keyboard processor 206, the keyboard controller 218, responding to well-known routines and controller commands from the CPU, can provide bidirectional information transfer between the CPU and the keyboard 202. Keyboard controller 218 may, for example, receive control commands for keyboard 202 via input buffer 225, typically at address 60h, through which the keyboard 202 may be enabled reset, key repetition rates and delays adjusted, keyboard data transfer path and command logic checked, and scan code sets selected.

The OS can also communicate and exert control over keyboard controller 218. The current state of the keyboard controller 218 can be determined by reading status register 226, typically at address 64h. Various well-known commands can be written to control register 228, which is also typically assigned address 64h. An exemplary command is a write output port command which allows an executing program to write to output port 230.

In Intel™ X86 and Pentium™ CPUs and compatibles, allowing a program to write to output port 230 also allows the program to execute a CPU reset. Output port 230 is typically a one byte register with a least significant bit being a processor reset bit, SYSR, which is coupled to the CPU RESET pin. To reset the CPU, the executing program instructs the keyboard controller 218, via command FEh written to control register 228, to accept a write output port command. The executing program then writes to output port 230 data that sets the SYSR bit, and the signal on SYSR causes the CPU to reset in a well-known manner.

Input port 215 and output port 230 of keyboard controller 218 may not only establish a connection between keyboard 202 and the CPU, but may also establish a connection to an auxiliary device 232 such as a mouse, gate chips, or other devices. Connection to the auxiliary device 232 is established by writing to the control register 228 the command write auxiliary device, and the next byte written to input buffer 225 is transferred to auxiliary device 232. Connection from the auxiliary device 232 is established by reading data transferred from auxiliary device 232 to output buffer 222. Output buffer 222 is read following an issued interrupt by using an appropriate auxiliary device driver.

Although a keyboard controller can provide usefil functions, there are several disadvantages of keyboard controllers which additionally can apply to other I/O devices. Physical space within a PC system is often limited especially in portable PC systems such as notebook computer systems, and keyboard controllers occupy physical space that could be used by other hardware. Additionally, connectability may also be at a premium given the increasing number of I/O devices demanding access to PC system buses. Furthermore, power consumption by I/O devices can contribute to a shortening of useful battery life in addition to increasing the power demand on a power supply. Moreover, cost competition in the PC industry can be intense and I/O devices contribute a noticeable amount to the overall cost of a PC system. Also, upgrading I/O device functions typically require complete replacement of the hardware.

Additionally, typically each OS includes a specific driver written to process data transfer between I/O devices and other PC system components such as the CPU. Elimination, modification, or substitution of hardware components, such as an I/O device, may require modifying the operating system(s) and/or all OS device drivers for each eliminated, modified, or substituted hardware component.

SUMMARY OF THE INVENTION

Specific functionality is often implemented in hardware in an effort to improve processing speed and efficiency. However, the present invention takes advantage of increasing CPU performance to emulate a variety of hardware functionality by implementing the functionality in software. By eliminating, in whole or in part, various hardware functions and replacing them with routines executed by a CPU, significant advantages of space, cost, maintainability, upgradeability, and power consumption may be achieved. The present invention takes advantage of a particular CPU operating mode, referred to as system management mode, and I/O trapping to emulate not only hardware functionality but also the hardware interface. The present invention may eliminate the need for operating system specific device drivers for hardware manipulation when a hardware component is completely emulated. Moreover, the present invention operates independently of any operating system.

In one embodiment of the present invention, a method of operating a computer system includes a memory coupled to a central processing unit, includes the steps of providing a peripheral device function request from the memory to the central processing unit, attempting to access a peripheral device address associated with the peripheral device function request, trapping the peripheral device address and associated function request, and providing instructions from the memory to the central processing unit to emulate the requested peripheral device function.

In another embodiment of the present invention, a computer system includes a memory having a program stored therein, an I/O device for entering data into the computer system, a processor, coupled to the memory, for executing instructions in an instruction stream provided to the processor from the memory, an I/O trap coupled to the processor to trap addresses within an address range, and a system management mode (SMM) code having an emulation module for examining the instruction associated with the trapped address and for emulating I/O device response to the instruction.

BRIEF DESCRIPTION OF THE DRAWINGS

The same feature appearing in multiple figures has the same reference numeral.

DETAILED DESCRIPTION

Figure 1:
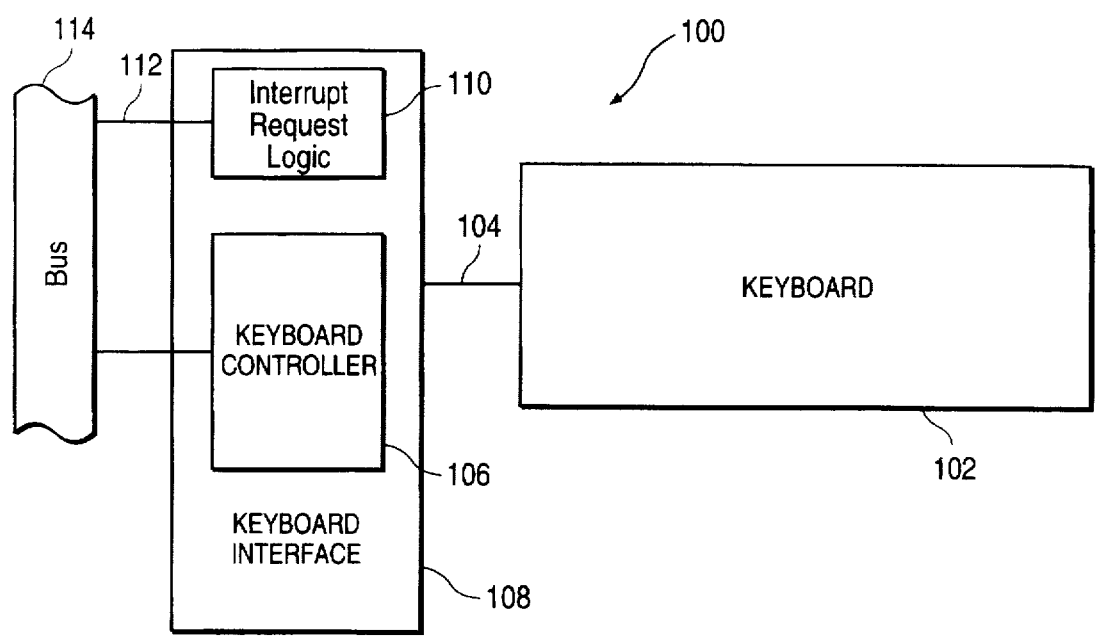
FIG. 1, labeled prior art, is a keyboard user interface.

The following description of the invention is intended to be illustrative only and not limiting.

In the following description, italicized words or phrases represent executable pseudocode.

Although functionality of a conventional keyboard controller has been described in some detail above, complete keyboard controller functionality and other I/O device functionality is well-known to those of ordinary skill in the art. The functionality described above is intended only to enhance understanding of the PC computer system 300 emulation methodology and not to limit the emulation methodology to explicitly described peripheral device function requests.

PC system 300 includes a microprocessor ("CPU") 305, for example, an Intel™ Pentium class microprocessor or Intel™ 80486 class microprocessor, having a processor 310 for handling integer operations and a coprocessor 315 for handling floating point operations. CPU 305 is coupled to cache 329 and memory controller 330 via CPU bus 391.

System controller I/O trap 392 couples CPU bus 391 to local bus 320 and is generally characterized as part of a system controller such as a Pico Power Vesuvious or an Intel™ Mobile Triton chip set. System controller I/O trap 392 can be programmed in a well-known manner to intercept a particular target address or address range, and, upon intercepting a target address, system controller I/O trap 392 asserts an intercept signal indicating that CPU 305 attempted to access the target address. In the emulation methodology embodiment of FIG. 5, the intercept signal is coupled to an SM ("system management interrupt") pin of CPU 305 to cause CPU 305 to enter system management mode ("SMM").

A main memory 325 of dynamic random access memory ("DRAM") modules is coupled to CPU bus 391 by memory controller 330. Main memory 325 includes a system management mode memory area which is employed to store keyboard controller emulation code as will be discussed in more detail subsequently.

A Basic Input Output System ("BIOS") memory 324 is coupled to local bus 320. A FLASH memory or other nonvolatile memory is used as BIOS memory 324. BIOS memory 324 stores the system code which controls some PC system 300 operations as discussed above.

Figure 3:
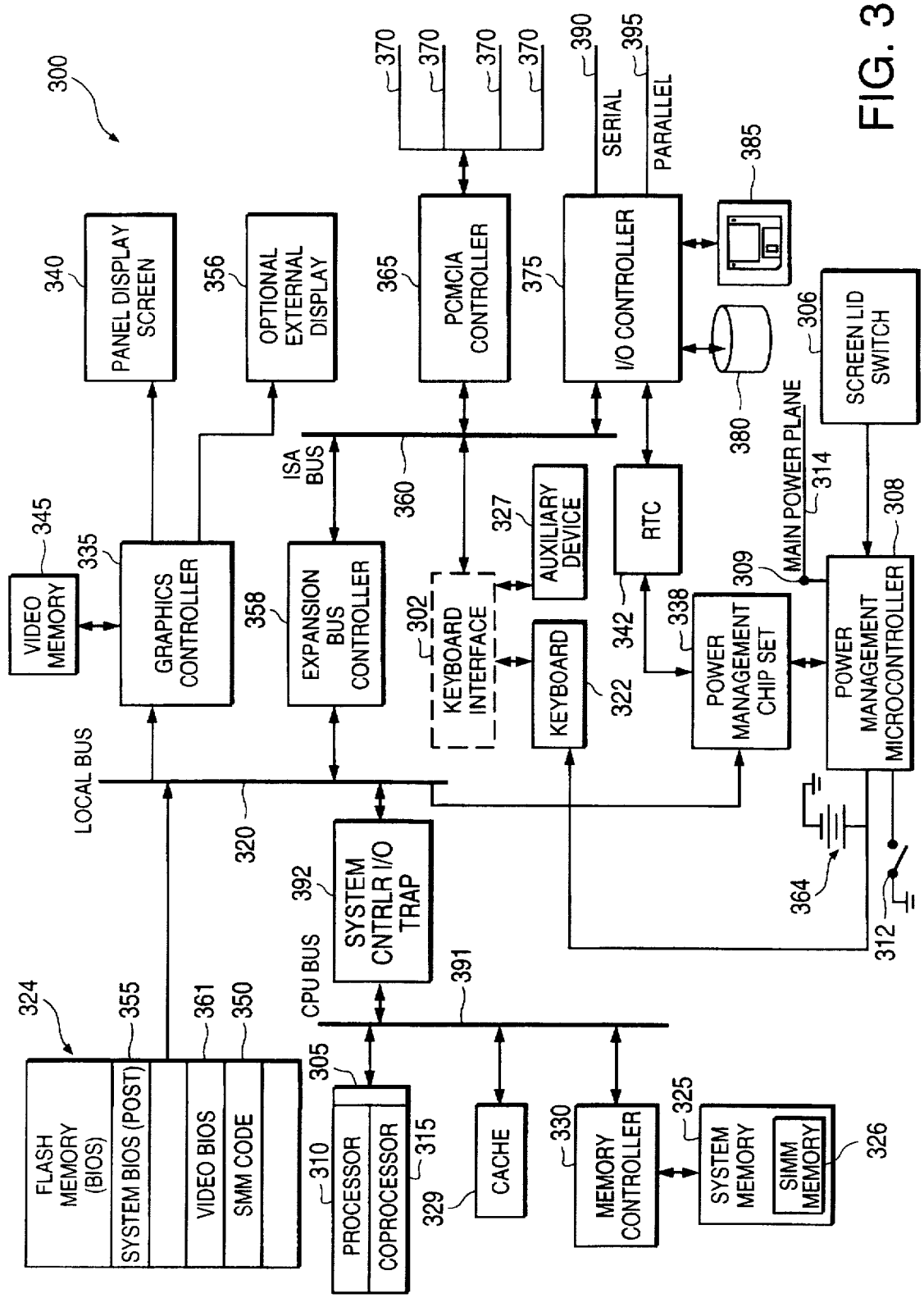
FIG. 3 is a block diagram of the disclosed PC system.

A graphics controller 335 is coupled to local bus 320 and to a panel display screen 340. Graphics controller 335 is also coupled to a video memory 345 which stores information to be displayed on panel display 340. Panel display 340 is typically an active matrix or passive matrix liquid crystal display ("LCD") although other display technologies may be used as well. Graphics controller 335 can also be coupled to an optional external display or standalone monitor display 356 as shown in FIG. 3. One graphics controller that can be employed as graphics controller 335 is the Cirrus Logic GD7542 graphics controller.

A bus interface controller or expansion bus controller 358 couples local bus 320 to an expansion bus 360. In this particular embodiment, expansion bus 360 is an Industry Standard Architecture ("ISA") bus although other buses, for example, a Peripheral Component Interconnect ("PCI") bus, could also be used. A personal computer memory card international association ("PCMCIA") controller 365 is also coupled to expansion bus 360 as shown. PCMCIA controller 365 is coupled to a plurality of expansion slots 370 to receive PCMCIA expansion cards such as modems, fax cards, communications cards, and other input/output devices.

An I/O controller 375 often referred to as a super I/O controller is coupled to ISA bus 360. I/O controller 375 interfaces to both an integrated drive electronics ("IDE") hard drive 380 and a floppy drive 385. I/O controller 375 also provides a serial interface 390 and a parallel interface 395 to which peripheral devices can be coupled.

PC system 300 includes a power supply 364, for example, a battery, which provides power to the many devices which form PC system 300. Power supply 364 is typically a rechargeable battery, such as a nickel metal hydride ("NiMH") or lithium ion battery, when PC system 300 is embodied as a portable or notebook computer. Power supply 364 is coupled to a power management microcontroller 308 which controls the distribution of power from power supply 364. More specifically, microcontroller 308 includes a power output 309 coupled to the main power plane 314 which supplies power to CPU 305. Power microcontroller 308 is also coupled to a power plane (not shown) which supplies power to panel display 340. In this particular embodiment, power control microcontroller 308 is a Motorola 6805 microcontroller. Microcontroller 308 monitors the charge level of power supply 364 to determine when to charge and when not to charge battery 364. Microcontroller 308 is coupled to a main power switch 312 which the user actuates to turn the PC system 300 on and off. While microcontroller 308 powers down other portions of PC system 300 such as hard drive 380 when not in use to conserve power, microcontroller 308 itself is always coupled to a source of energy, namely power supply 364.

Power management microcontroller 308 is also coupled to a keyboard interface 302 which is coupled to ISA bus 320. A keyboard 322 and auxiliary device 327, for example, a mouse, gate chips, or other devices, are coupled to keyboard interface 302 provide PC system 300, for example, with user input.

In a portable embodiment, PC system 300 also includes a screen lid switch 306 or indicator 306 which provides an indication of when panel display 340 is in the open position and an indication of when panel display 340 is in the closed position. It is noted that panel display 340 is generally located in the same location in the lid of the computer as is typical for "clamshell" types of portable computers such as laptop or notebook computers. In this manner, the display screen forms an integral part of the lid of the computer which swings from an open position for interaction with the user to a close position.

PC system 300 also includes a power management chip set 338 which includes power management chip models PT86C521 and PT86C522 manufactured by Pico Power. Power management chip set 338 is coupled to CPU 305 via local bus 320 so that power management chip set 338 can receive power control commands from CPU 305. Power management chip set 338 is connected to a plurality of individual power planes which supply power to respective devices in PC system 300 such as hard drive 380 and floppy drive 385, for example. In this manner, power management chip set 338 acts under the direction of CPU 305 to control the power to the various power planes and devices of the computer. A real time clock ("RTC") 340 is coupled to I/O controller 375 and power management chip set 338 such that time events or alarms can be transmitted to power management chip set 338. Real time clock 340 can be programmed to generate an alarm signal at a predetermined time.

Figure 3A:
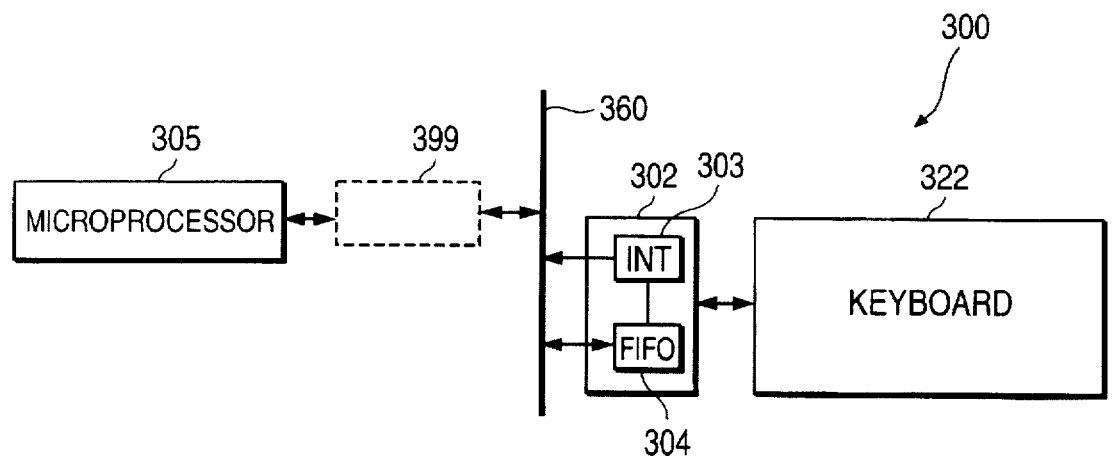
FIG. 3A one embodiment of a hardware keyboard interface of the PC system of FIG. 3.

As described in more detail below, some or all of the functionality of a conventional keyboard controller is transferred to an emulation methodology using code in SMM memory 326 executed by CPU 305. If all keyboard controller functionality is transferred to the emulation methodology, the keyboard controller of keyboard interface 302 may be eliminated. As a result of eliminating the keyboard controller, keyboard interface 302 may have a simpler implementation as illustrated in FIG. 3A that includes a first in first out ("FIFO") buffer or that includes a conventional serial interface. Alternatively, keyboard interface 302 may include a keyboard controller such as keyboard controller 218, and keyboard controller emulation may be limited to specific functions as described in more detail below.

Referring to FIG. 3A, one embodiment of a PC system 300 hardware keyboard interface 302 is illustrated. The FIFO buffer 304 of keyboard interface 302 generally has only one address and transfers data to CPU 305 through bus 360 and intervening PC system 300 components 399. FIFO buffer 304 may receive information from CPU 305 for transmission to keyboard 322 and may receive information from keyboard 322 for transmission to CPU 305. When FIFO buffer 304 receives information from keyboard 322, interrupt logic 303 issues an interrupt request to CPU 305. When FIFO buffer 304 receives information from CPU 305, FIFO buffer 304 transmits the information to keyboard 322. Subsequent processes for both events will be described below in conjunction with FIG. 5. An alternative embodiment of keyboard interface 302 utilizes a conventional serial interface having well-known characteristics. Implementing PC system 300 with keyboard interface 302 typically provides substantial cost savings over a PC system implemented with a conventional keyboard interface having a keyboard controller.

When PC system 300 is turned on or powered up, the system BIOS software stored in non-volatile BIOS memory 324 is copied into main memory 325 so that it can be executed more quickly. This technique is referred to as "shadowing" or "shadow RAM" as discussed above. At this time, SMM code 450 is also copied into the system management mode memory area 326 of main memory 325. CPU 305 executes SMM code 450 after CPU 305 receives a system management interrupt ("SMI") which causes the microprocessor to enter SMM. Additional conditions under which an SMI is generated are discussed subsequently. It is noted that along with SMM code 450, also stored in BIOS memory 324 and copied into main memory 325 at power up are system BIOS 355 (including a power on self test (POST) and video BIOS 361. It will be recognized by those of ordinary skill in the art that other memory mapping schemes may be used. For example, SMM code 450 may be stored in fast SRAM memory coupled to CPU 305.

Figure 4:
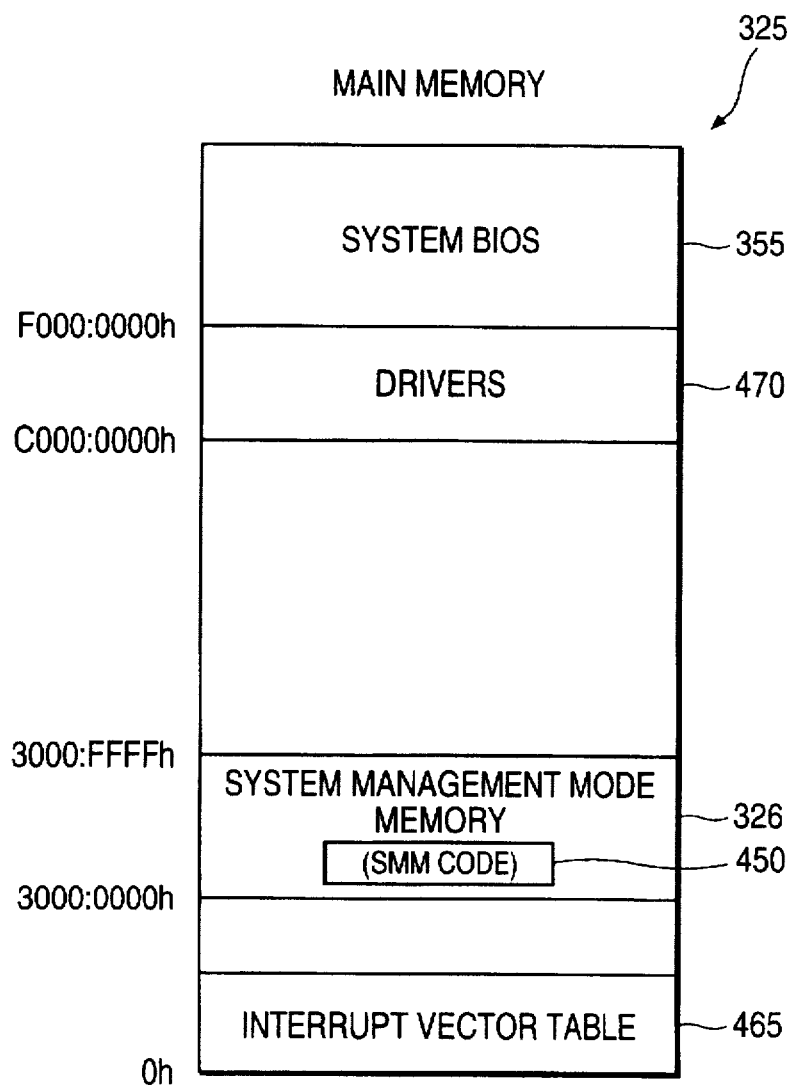
FIG. 4 is a representation of the main memory of the computer system of FIG. 3.

Referring to FIG. 4, a diagram of main memory 325 illustrates SMM code 450 storage in system management mode memory area 326 after being loaded into main memory 325. In this particular embodiment, SMM memory area 326 resides between main memory addresses 3000:0000h and 3000:FFFFh. Although SMM memory area 326 includes only 64 Kbytes, microprocessors such as the Pentium™ microprocessor can also access data outside system management mode memory area 326. Also loaded in main memory 325 at power up is an interrupt vector table 465 which is part of the system BIOS and directs the CPU 305 to particular interrupt handlers. Main memory also includes drivers 470. Memory areas not otherwise designated in main memory 325 of FIG. 4 are available for the operating system and user application codes.

Figure 5:
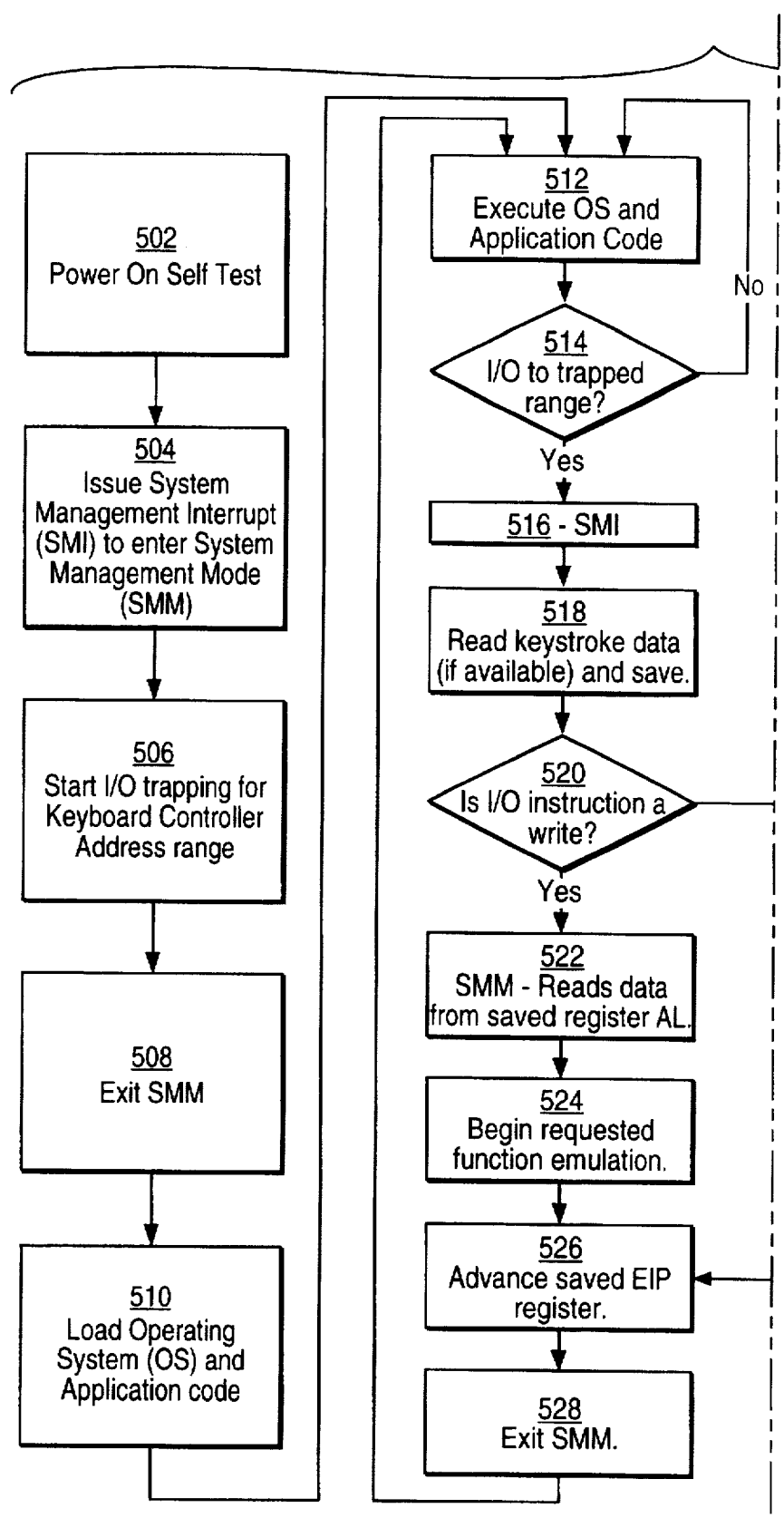
FIG. 5 is a flow chart depicting the process flow of the keyboard controller emulation methodology employed in the computer system of FIG. 3.
Figure 5B:
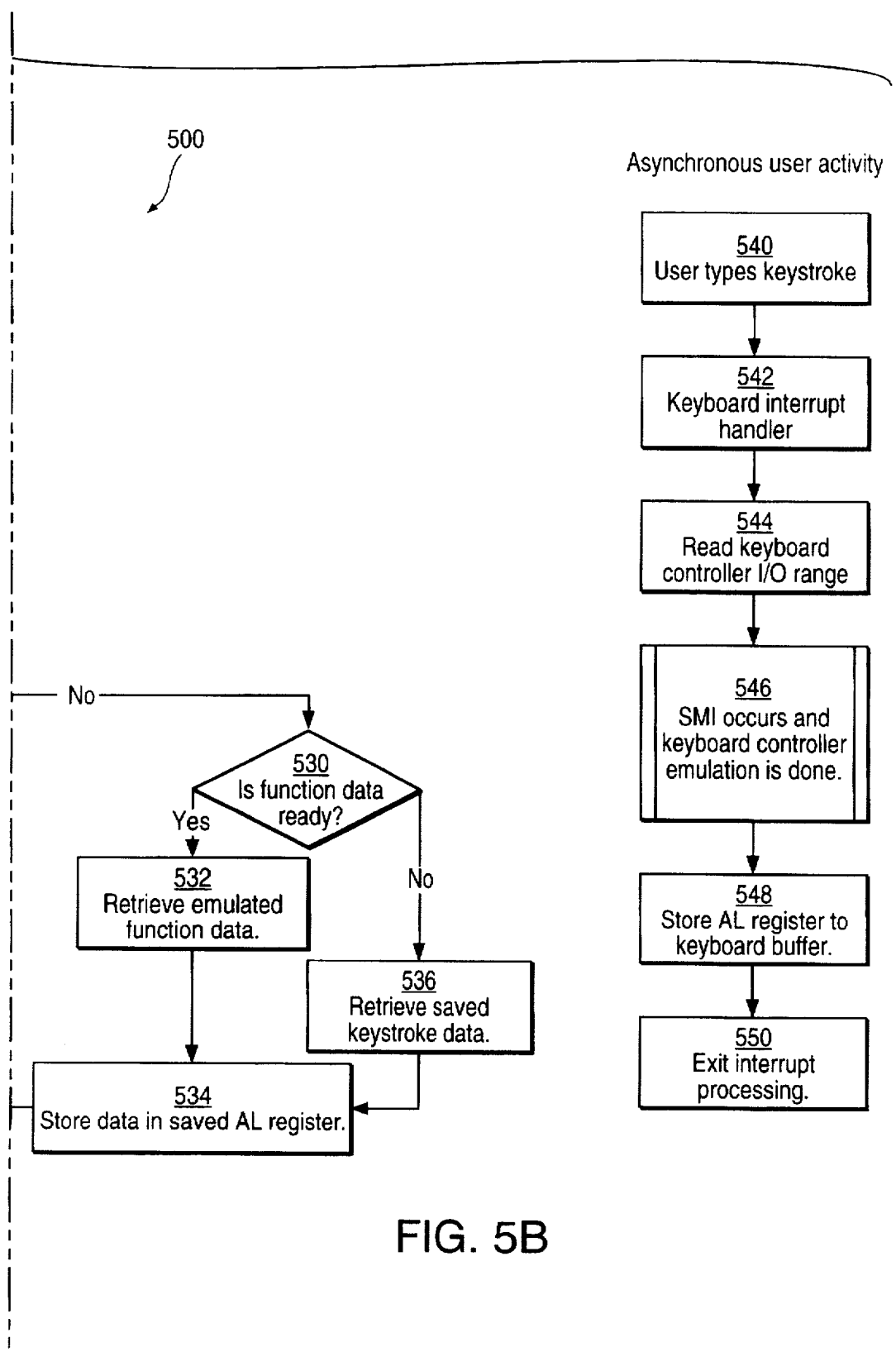

Referring to FIG. 5, with the system BIOS 355 thus copied into main memory 325, the POST module of BIOS executes to commence initialization of PC system 300 as block 502 indicates. The POST routine includes verification of system hardware functionality such as hard disk drive 380, processor 305 registers, floppy disk drive 385, and the keyboard controller of keyboard interface 302. The POST routine can be considered as executing in block 512 and an attempted access to a keyboard controller results in a departure to block 516 with full emulation of a keyboard controller utilizing SMM code 450 in a process described more fully below. At block 504, BIOS issues an SMI which causes CPU 305, in a well-known manner, to store current register values necessary to restore the original condition in main memory 325, initialize CPU 305 registers for SMM, and enter SMM as per block 504. Upon entering system management mode, I/O trapping of addresses within the range of addresses assigned to keyboard interface 302 is initiated and commences as per block 506. This I/O trapping is implemented as discussed above by programming system controller I/O trap 392 to intercept I/O activity involving an address within an address range, such as 60h–6Fh, associated with a keyboard controller. One implementation embodiment of block 506 uses SMM code to program system controller I/O trap 392 to intercept an attempted access by CPU 305 to address range 60h–6Fh. When system controller I/O trap 392 intercepts a target address, the I/O trap output signal line connected to the SMI pin of CPU 305 is activated causing CPU 305 to enter SMM as discussed above.

Once I/O trapping has started, SMM is exited as per block 508 with an explicit resume from system management mode instruction such as RSM. The operating system and applications software are now loaded as per block 510. Execution of the operating system and applications software code commences at block 512.

With I/O trapping commenced, system controller I/O trap 392 traps all I/O addresses within a predetermined range that propagate between local bus 320 and CPU bus 391 as indicated in decision block 514. If the I/O address does not fall within the predetermined address range, the application code and OS continue executing. In this embodiment, system controller I/O trap 392 conducts a test to determine if an application code attempted to output information to keyboard controller address range of 60h–6Fh. This determination can be made, for example, by examining any I/O to the device instruction and comparing the associated instruction destination address with 60h–6Fh. If the intercepted address is within the range previously determined and subsequently programmed by SMM code into system controller I/O trap 392, system controller I/O trap 392 traps the destination address and issues an SMI activation signal on the SMI pin of CPU 305. With the SMI issue, a system management interrupt occurs as indicated in block 516, and CPU 305 stores its current registers, including the current code segment ("CS") and extended instruction pointer ("EIP") registers, and begins executing SMM code in system management memory 326 (FIG. 3).

Referring to block 518, the SMM code 450 reads data stored in keyboard interface 302, if a user has entered data into keyboard interface 302, for example, through keyboard 322. If data has been stored in keyboard interface 302, generally indicating that the SMI in block 516 resulted from keyboard interface 302 interrupt request described below, SMM code 450 issues instructions to CPU 305 to retrieve the data and store it in a reserved area of SMM memory 326 (FIG. 3) referred to herein as an "SMM keystroke data buffer".

Emulation methodology 500 next determines whether or not the I/O instruction to the trapped range from the application code was a write or read instruction to the trapped range as indicated in decision block 520. In one embodiment, SMM code 450 uses the contents of the EIP register to examine the instruction that caused the SMI to issue. If SMM code 450 determines that the instruction requested a write operation (output to I/O device), SMM code 450 requests CPU 305 to read the contents of register AL to determine the I/O data content which was to be output to a keyboard controller as indicated in block 522. In popular Intel™ CPUs and compatibles, register EAX contains the data intended to be output to I/O devices or input from I/O devices. In one embodiment, data written to a keyboard controller is only one byte wide and is contained in the least significant byte of register EAX, register AL. Therefore, only register AL need be read by SMM code 450 in this embodiment. However, in other embodiments, EAX may be read wholly or partially as necessary according to the width of the data content transferred between an I/O device and a CPU.

After reading the contents of AL, SMM code 450 uses the data in register AL as a function code requested by the application code, and SMM code 450 proceeds as indicated in block 524 to perform the function requested using the processing capabilities of CPU 305. Depending on the function requested, SMM code 450 may have requested data retrieval from FIFO 304. If so, the data from the emulated function is stored in an area of SMM memory 326 (FIG. 3) herein referred to as a "keyboard controller emulated data location". In one example, if the application attempts to set the gate for A20 bit of a keyboard controller output port, SMM code 450 reads the contents of AL and determines that a processor reset function is requested. In response, the SMM code 450 issues an output 02h to base address 092h resets A20 line instruction to perform the A20 line reset.

After performing the function requested by the application, the saved contents of register EIP are advanced according to the length of the requested operation, as indicated in block 526, so that CPU 305 executes the next application code instruction once emulation methodology returns to block 512. A resume from system management mode instruction is executed to exit SMM as indicated in block 528. Emulation methodology 500 then repeats from block 512.

Referring again to block 520, if SMM code 450 determines that application code instruction requested a read (input from I/O device) operation to a keyboard controller address range, SMM code 450 determines whether or not function data is available which was saved in the "keyboard controller emulated data location" as indicated in block 530. If data from an emulated function is available, the function data stored in block 524 is retrieved as indicated in block 532 and stored in register AL as indicated in block 534. Emulation methodology 500 then proceeds with the process in block 526 as described above. If in block 530, no data from an emulated function is available, indicating the SMI was generated as a result of the keyboard interface 302 interrupt request described below, the keystroke data stored in the SMM keystroke data buffer is retrieved as indicated in block 536 and stored in register AL as indicated in block 534. Emulation methodology 500 then proceeds with the process in block 526 as described above.

The following operational example describes emulation of an attempt by application code to read data from a keyboard controller input port. The application will pass a write to I/O port instruction, for example, OUT 64h, C0h, to CPU 305. CPU 305 writes the address 64h and function code C0h on CPU bus 391 as indicated in block 512. System controller I/O trap 392 traps the address 64h, as indicated in block 514, and issues an SMI as indicated in block 516. No keystroke data is available, and the emulation process proceeds to block 520. SMM code 450 examines the instruction pointed to by register EIP and determines that a write instruction has been executed as indicated in block 522. SMM code 450 reads the function code C0h which has been stored in AL by the OUT instruction and then responds by creating an emulation response that emulates a conventional keyboard interface response as indicated in block 524. The emulation response reflects the emulated action. The created data is stored in the keyboard controller emulated data location and the emulation process proceeds to blocks 526, 528, and 512.

Continuing, the application will pass a readfrom I/O port instruction, for example, IN al, 64h, to CPU 305. CPU 305 writes the address 64h and instruction on CPU bus 391 as indicated in block 512. System controller I/O trap 392 traps the address 64h, as indicated in block 514, and issues an SMI as indicated in block 516. No keystroke data is available, and the emulation process proceeds to block 520. SMM code 450 examines the instruction pointed to by register EIP and determines that a read status register instruction has been executed as indicated in block 520. SMM code 450 then proceeds to block 530 and retrieves function data stored in SMM memory 326 (FIG. 3) as indicated in block 332, that emulates data available from a keyboard status register indicating data contents in a keyboard controller output buffer. SMM code 450 stores the emulated function data in register AL as indicated in block 534, and the emulation process proceeds to blocks 526, 528, and 512.

Continuing, the application will pass another readfrom I/O port instruction, for example, IN al, 60h, to CPU 305. CPU 305 writes the address 60h and instruction on CPU bus 391 as indicated in block 512. System controller I/O trap 392 traps the address 60h, as indicated in block 514, and issues an SMI as indicated in block 516. No keystroke data is available, and the emulation process proceeds to block 520. SMM code 450 examines the instruction pointed to by register EIP and determines that a read instruction has been executed as indicated in block 520. SMM code 450 proceeds to block 530 and determines that data from the emulated function C0h is available in the keyboard controller emulated data location. SMM code 450 then retrieves the emulated function data from the keyboard controller emulated data location, as indicated in block 532, and stores the emulated function data in register AL as indicated in block 534. The emulation process proceeds to blocks 526, 528, and 512.

Figure 2:
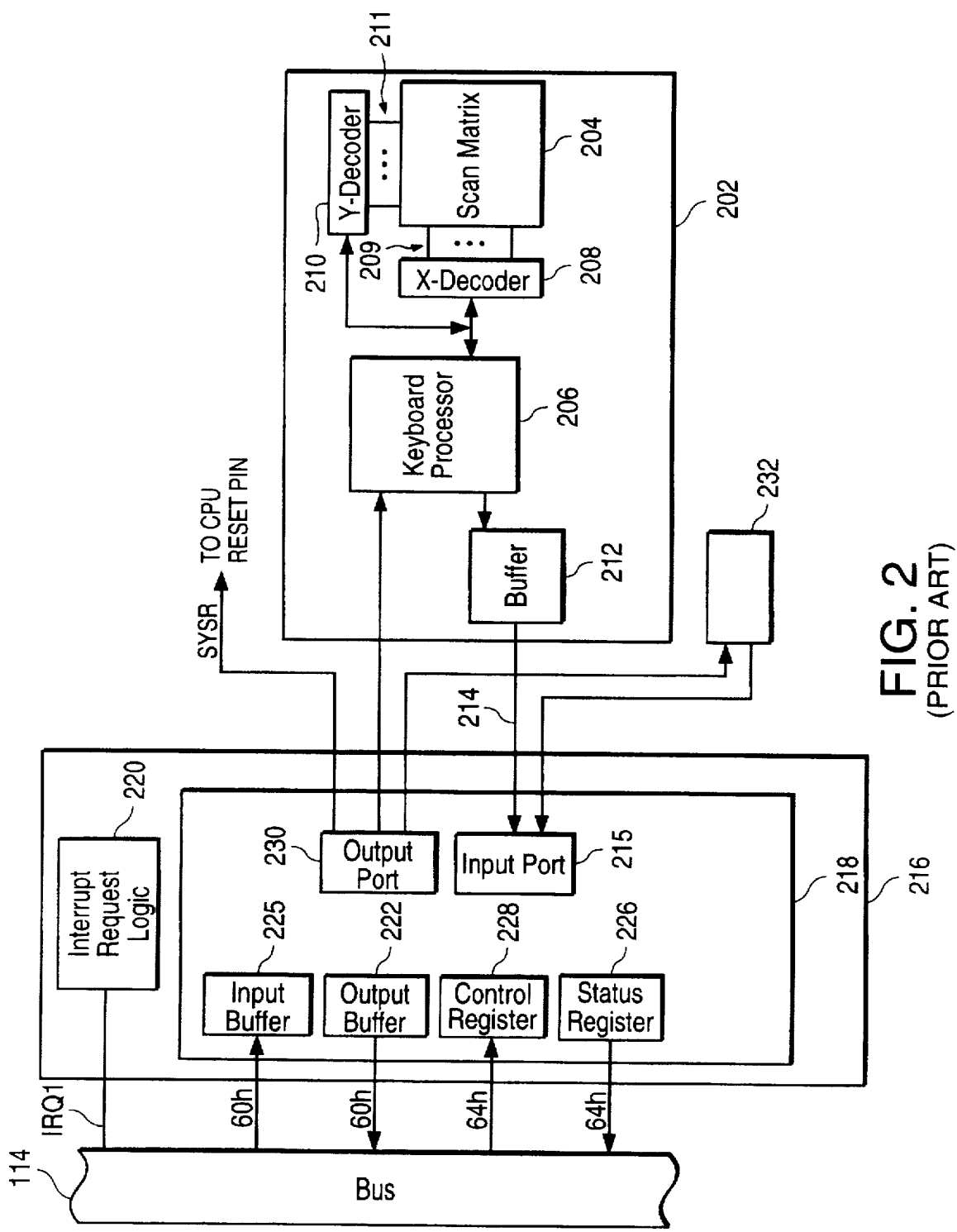
FIG. 2, labeled prior art, is one embodiment of the keyboard user interface of FIG. 1.

While the CPU 305 is, for example, executing application code or performing other tasks, asynchronous user activity involving an I/O device may independently commence. An example of asynchronous user activity commencement is indicated in block 540. A user may use keystrokes to enter data into PC system 300 through keyboard 322 as indicated in block 540. Keyboard 322 may be, for example, similar or identical to keyboard 202 (FIG. 2). After FIFO receives the data, interrupt logic 303 in keyboard interface 302 issues an interrupt request to processor 305. CPU 305 services the interrupt request by entering a conventional keyboard interrupt handler routine of a keyboard driver as indicated in block 542. The keyboard interrupt handler routine provides a read I/O instruction to CPU 305 which requests access to an address within the keyboard controller address range being trapped by system controller I/O trap 392. At this point as indicated by block 546, an SMI occurs as in block 516 and the emulation methodology 500 proceeds as described above from block 518. After exiting SMM as indicated in block 528, the interrupt handler routine resumes execution at block 548 and stores the keystroke data, previously saved in register AL as indicated in block 534 into an OS keyboard buffer. The interrupt handler then exits as indicated in block 550, and execution of the OS code in block 512 proceeds.

As described, emulation methodology 500 includes SMM code 450 which utilizes CPU 305 to emulate requested functions and data transfer conventionally undertaken with assistance from a keyboard controller. Although emulation of the processor reset function has been described, it will be appreciated by one of ordinary skill in the art after reading this application that most, if not all, functions conventionally performed by keyboard controller may be emulated using SMM code and a microprocessor such as CPU 305. Furthermore, SMM code 450 can also utilize CPU 305 to emulate only a portion of the keyboard controller functionality by analyzing the function requested and returning control to a conventional keyboard driver if the function is not identified as a function to be emulated. For example. If keyboard controller functionality is only partially emulated, keyboard interface 302 may include a conventional keyboard controller or include a keyboard controller having non-emulated functionality. Additionally, SMM executes independent of the PC system 300 operating system(s), and generally no modifications to the OS are required.

While the invention has been described with respect to the embodiments and variations set forth above, these embodiments and variations are illustrative and the invention is not to be considered limited in scope to these embodiments and variations. For example, although one embodiment of an I/O device emulation methodology is illustrated in FIG. 5, other I/O devices may be wholly or partially emulated in addition to or as an alternative to exemplary emulation methodology 500 by I/O trapping instructions addressed to emulated I/O devices and performing the trapped instructions using appropriate SMM code and CPU processing capabilities. Knowledge of specific I/O device instructions and hardware requirements is well-known in the art. Also, although keyboard interface information is generally transferred one byte at a time using register AL, information transferred between other I/O devices or other keyboard interfaces and a CPU may be transferred using more than one byte. As a result, references to register AL may be substituted with references to AX, EAX, or other registers and variations thereof to accommodate the increased bandwidth. Although, a CPU is referred to herein, other processors including multiprocessing systems may be used. Accordingly, various other embodiments and modifications and improvements not described herein may be within the spirit and scope of the present invention, as defined by the following claims.

What is claimed is:

1. A method of operating a computer system having a memory coupled to a processor, the method comprising the steps of:

trapping an address to an I/O device address range;

checking a type of an I/O operation associated with the trapped address; and replacing an I/O device function associated with the I/O operation type by providing instructions from the memory to the processor which completely emulate the I/O device function.

2. The method of claim 1 further comprising the step of: programming a system controller I/O trap to trap the address between the processor and the I/O device.

3. The method of claim 2 further comprising the steps of:

issuing a system management interrupt during initialization of the processor;

entering a system management mode of the processor;

initializing a system controller I/O trap to perform the trapping step;

exiting system management mode after the step of programming the system controller I/O trap.

4. The method of claim 1 wherein the I/O device is a keyboard controller.

5. The method of claim 1 further comprising the steps of:

loading an application program into the memory of the computer system;

executing the application program;

requesting, from the application program, an I/O operation to the I/O device; and performing an I/O operation to the address range of the I/O device in response to the request by the application program.

6. The method of claim 1 further comprising the steps of:

after the step of trapping an an address to an I/O device range, issuing a system management interrupt request; and entering system management mode in response to the system management mode interrupt request.

7. The method of claim 1 further comprising the step of:

executing an application program;

passing an I/O instruction having a function code from the application program to the processor;

saving an instruction pointer register contents in response to trapping the I/O operation to the I/O device address range;

wherein the step of checking a type of the I/O operation comprises the steps of:

examining the contents of the instruction pointer register;

determining the type of instruction pointed to by the contents of the instruction pointer register; and determining a function code associated with the instruction.

8. The method of claim 1 wherein the instructions from the memory reside in system management mode memory.

9. The method of claim 1 wherein the I/O operation requests data from the I/O device, the method further comprising the steps of:

providing data from the memory to the processor to emulate the requested data.

10. The method of claim 1 wherein the instructions allow the processor to access the I/O device independent of an operating system.

11. A method of operating a computer system having a memory coupled to a central processing unit, the method comprising the steps of:

providing a peripheral device function request from the memory to the central processing unit;

attempting to access a peripheral device address associated with the peripheral device function request;

trapping the peripheral device address;

determining the peripheral device function request;

providing instructions from the memory to the central processing unit which completely emulate the requested peripheral device function; and emulating a complete response to the peripheral device function request.

12. The method of claim 11 further comprising the steps of:

issuing a system management interrupt to the central processing unit;

entering system management mode of the computer system;

programming a system controller I/O trap to trap I/O activity involving the peripheral device address;

exiting system management mode;

loading operating system code into the memory;

loading application code into the memory; and executing the application code.

13. The method of claim 12 further comprising the steps of:

after the step of trapping the peripheral device address, issuing a system management interrupt from the system controller I/O trap to the central processing unit;

storing current registers of the central processing unit in response to the system management interrupt;

entering system management mode;

executing system management mode code stored in the memory independent of the operating system;

determining the type of the peripheral device function request;

if the function request is a 'write data' request, the method comprises the steps of:

determining the data content of the peripheral device function request; and issuing instructions from the system management mode code to the central processing unit to emulate the peripheral device function request; and exiting system management mode; and if the fiction request is a 'read data' request, the method comprises the steps of:

determining whether the data is emulated data;

if the emulated data is available in system management memory, retrieving the emulated data;

if the emulated data is not available, retrieving the requested data from the peripheral device; and transmitting the data to the central processing unit; and exiting system management mode.

14. The method of claim 13 further comprising the steps of:

after entering system management mode, retrieving keystroke data; and storing the keystroke data in a predetermined memory location accessible to the central processing unit, wherein the function request is a read keystroke data request.

15. The method of claim 13 wherein the step of storing current registers of the central processing unit comprises the step of saving an instruction pointer register contents, and the step of determining the type of the peripheral function request comprises the steps of:

examining the contents of the instruction pointer register;

determining the type of peripheral device function request pointed to by the contents of the instruction pointer register; and determining a function code associated with the function request.

16. The method as in claim 13 wherein the peripheral device address is a keyboard controller address.

17. The method of claim 11 wherein the instructions are system management code residing in system management mode memory, and the peripheral device function request is a request to read keystroke data from a keyboard peripheral device, the method further comprising the steps of:

issuing a system management mode interrupt to the central processing unit;

entering system management mode;

retrieving keystroke data if available independent of an operating system;

storing the retrieved keystroke data in system management memory; and writing the retrieved keystroke data in a predetermined memory location accessible to the central processing unit.

18. The method of claim 11 wherein the memory coupled to the central processing unit includes system management memory.

19. The method of claim 11 wherein the peripheral device address includes a range of addresses.

20. The method of claim 11 further comprising the steps of:

after the step of trapping the peripheral device address, issuing a system management interrupt; and entering system management mode;

wherein the step of providing instructions from the memory comprises the step of:

providing instructions from system management mode memory.

21. The method of claim 11 wherein the peripheral device is a keyboard controller.

22. The method of claim 11 wherein the step of providing a peripheral device function request comprises the step of executing application code, the method further comprising the step of:

receiving instructions from the application code with the central processing unit to perform the function request wherein the requested function request is a member of the group consisting of a write to I/O port instruction and a read from I/O port instruction.

23. The method as in claim 11 further comprising the step of:

after the step of trapping the peripheral device address, issuing a system management interrupt to central processing unit.

24. A computer system comprising:

a memory having a program stored therein, an I/O device for entering data into the computer system and receiving data from the computer system;

a processor, coupled to the memory and the I/O device, for executing instructions provided to the processor from the memory;

an I/O trap coupled to the processor to intercept addresses, within an I/O device address range, associated with an instruction; and system management mode (SMM) code stored in the memory and executable by the processor and having an emulation module for examining the instruction associated with the intercepted address and for replacing an I/O device function by completely emulating an I/O device response to the instruction.

25. The computer system of claim 24 wherein the SMM code includes another module for programming the I/O device intercept address range into the I/O trap.

26. The computer system of claim 24 wherein the processor includes a system management interrupt (SMI) terminal, and the I/O trap includes circuitry to assert a signal on the processor SMI pin if the I/O trap intercepts and traps an address associated within the address range.

27. The computer system of claim 24 wherein the I/O device is a keyboard having a keyboard controller, the keyboard controller farther comprising:

a first in first out unit (FIFO) coupled between the I/O device and the keyboard for receiving keyboard data; and interrupt logic coupled to the FIFO and the processor, wherein the instruction is received by the processor in response to a signal generated by the interrupt logic, and the signal is generated in response to any keyboard data received by the FIFO, wherein the emulation module of the SMM code is capable of emulating any responses of the keyboard controller to any keyboard controller read and write operations from the processor.

28. The computer system of claim 24 wherein the instruction, associated with the intercepted address, includes function data and is a 'write data' instruction to the I/O device.

29. The computer system of claim 24 wherein the instruction, associated with the intercepted address, is a 'read data' request, and the emulation module retrieves the data and provides the data to the processor.

30. The computer system of claim 29 wherein the emulation module retrieves the data from the I/O device.

31. The computer system of claim 24 wherein a portion of the memory is reserved for the SMM code and for a data buffer utilized by the SMM code to store emulated I/O device data.

32. The computer system of claim 31 wherein the emulated I/O device data is keyboard status data.

33. The computer system of claim 24 further comprising:
an operating system in said memory, wherein the SMM code is processed by the processor independently of the operating system.

34. The computer system of claim 24 wherein the I/O trap is a system controller I/O trap.

35. The computer system of claim 24 wherein the computer system includes a laptop computer.

36. The method as in claim 24 wherein the I/O device is incapable of responding to the instruction.

37. A computer system comprising:
means for storing instructions;
means for processing instructions received from the means for storing code;
means for detecting an address of a predetermined I/O device;
means for programming the means for detecting to detect an address of the predetermined I/O device;
means for trapping detected addresses of the predetermined I/O device;
means for interrupting the means for processing if the means for detecting detects an address of the predetermined I/O device and the means for trapping traps a detected address to the predetermined I/O device;
means for determining an I/O device operation instruction associated with a detected and trapped address of the predetermined I/O device; and
means for completely emulating an I/O device response to the determined I/O device operation instruction by providing instructions to the means for processing.

38. The computer system of claim 37 wherein the means for emulating includes:
means for retrieving data from the means for storing if the I/O operation instruction type is a 'read' instruction; and
means for storing data if the I/O operation instruction type is a 'data write' instruction; and
the means for determining includes:
means for determining the type of I/O device operation instruction associated with a detected and trapped address of the predetermined I/O device.

39. A method of operating a computer system having a memory coupled to a processor, the method comprising the steps of:
trapping an address to an I/O device address range;
after the step of trapping an address to an I/O device range, issuing a system management interrupt request to the processor;
entering system management mode in response to the system management mode interrupt request;
checking a type of an I/O operation associated with the trapped address; and
providing instructions from the memory to the central processing unit to emulate the requested I/O operation.

40. The method as in claim 39 wherein the I/O device address range is an address range of a keyboard controller.

41. The method as in claim 39 wherein the step of providing comprises providing instructions from the memory to the processor to completely emulate a response to the requested I/O operation.

* * * * *